United States Patent
Beck

(10) Patent No.: US 7,364,142 B2
(45) Date of Patent: Apr. 29, 2008

(54) SPRING STRUT UNIT FOR SUSPENSION SYSTEMS OF MOTOR VEHICLES

(75) Inventor: Hubert Beck, Eitorf (DE)

(73) Assignee: ZF Friedrichshafen AG, Friedrichshafen (DE)

(*) Notice: Subject to any disclaimer, the term of this patent is extended or adjusted under 35 U.S.C. 154(b) by 268 days.

(21) Appl. No.: 11/064,323

(22) Filed: Feb. 23, 2005

(65) Prior Publication Data

US 2005/0199457 A1    Sep. 15, 2005

(30) Foreign Application Priority Data

Mar. 10, 2004    (DE) .................. 10 2004 011 632

(51) Int. Cl.
*B60G 17/00* (2006.01)
(52) U.S. Cl. .................... 267/64.17; 188/315
(58) Field of Classification Search ............ 267/218, 267/221, 64.17; 188/314, 315
See application file for complete search history.

(56) References Cited

U.S. PATENT DOCUMENTS

| | | | | |
|---|---|---|---|---|
| 3,353,813 A | * | 11/1967 | Erdmann et al. | 267/218 |
| 3,628,810 A | * | 12/1971 | Ggaef | 280/6.159 |
| 3,936,039 A | * | 2/1976 | McKinnon | 267/34 |
| 5,009,451 A | * | 4/1991 | Hayashi et al. | 280/6.157 |
| 5,401,053 A | * | 3/1995 | Sahm et al. | 280/5.502 |
| 5,984,286 A | * | 11/1999 | Busch et al. | 267/218 |
| 6,676,119 B2 | | 1/2004 | Becker et al. | |

FOREIGN PATENT DOCUMENTS

GB    2 164 417    3/1986

\* cited by examiner

*Primary Examiner*—Bradley King
(74) *Attorney, Agent, or Firm*—Cohen Pontani Lieberman & Pavane LLP

(57) ABSTRACT

Spring strut unit for suspension systems of motor vehicles with a fastening connection on the body side and another fastening connection on the wheel side; with a helical spring supported between the body and the wheel; and with a vibration damper installed between the body-side fastening connection and the wheel-side fastening connection. The vibration damper includes a working cylinder, a damping piston attached to a piston rod, damping valves installed in the damping piston, and a compensating space. The helical spring can be pretensioned by a ring-shaped cylinder, which can be actuated by a hydraulic medium. A pump rod is mounted in a permanent axial position in the working cylinder of the vibration damper and cooperates with a cavity in the piston rod to form a pump space. Axial movements of the piston rod cause damping medium to be conveyed through flow connections from one of the working spaces of the working cylinder via the pump space and through a flow connection of the pump rod into the ring-shaped cylinder.

19 Claims, 4 Drawing Sheets

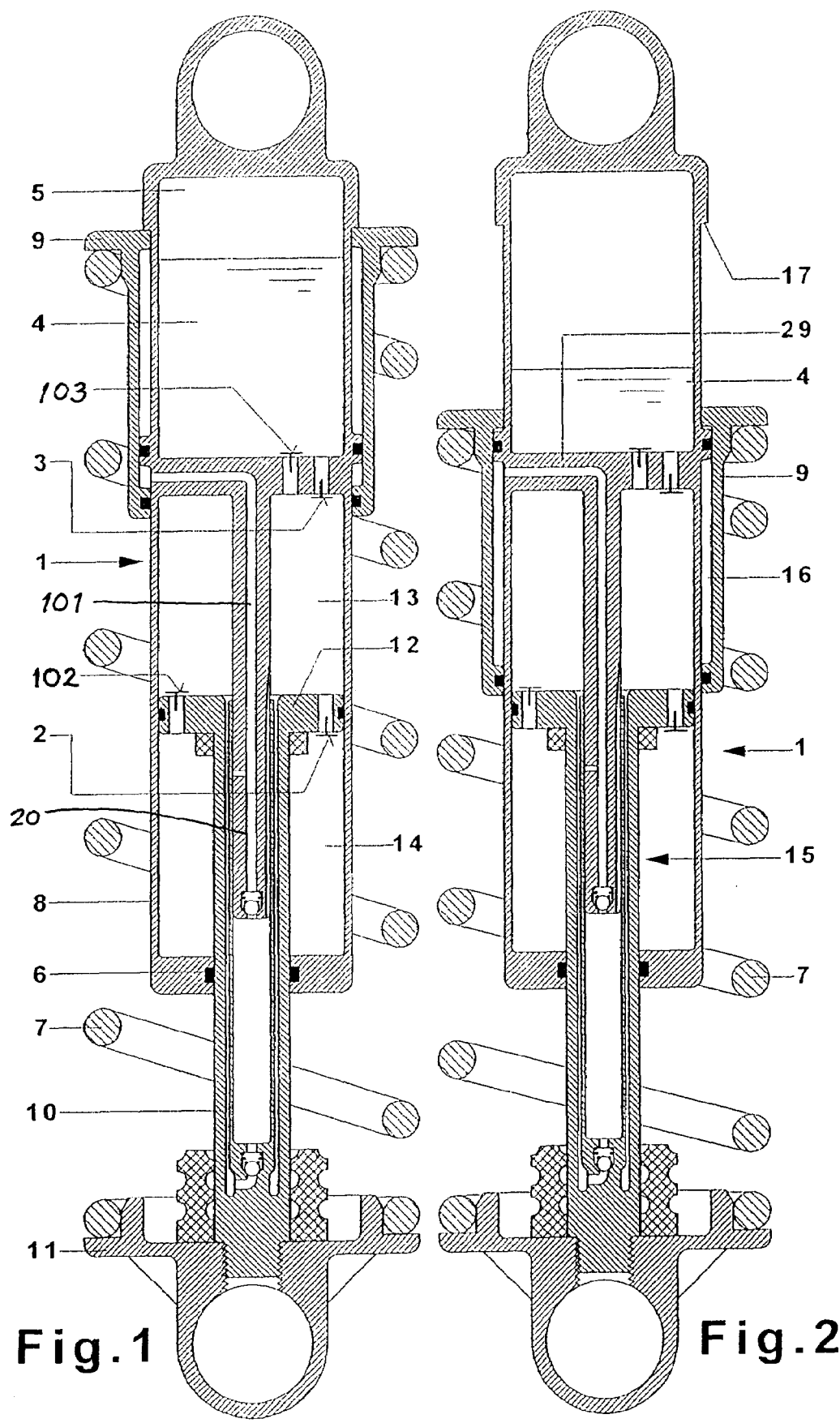

SPRING STRUT UNIT FOR SUSPENSION SYSTEMS OF MOTOR VEHICLES

BACKGROUND OF THE INVENTION

1. Field of the Invention

The invention pertains to a spring strut unit for suspension systems of motor vehicles with a fastening connection on the body side and another fastening connection on the wheel side; with a helical spring supported between the body and the wheel; and with a vibration damper installed between the body-side fastening connection and the wheel-side fastening connection, where the vibration damper consists of a working cylinder, a damping piston attached to a piston rod, damping valves installed in the damping piston, and a compensating space, and where the helical spring can be pretensioned by a ring-shaped cylinder, which can be actuated by a hydraulic medium.

2. Description of the Related Art

Spring strut units for suspension systems of motor vehicles are already known in which a vibration damper is coaxially surrounded by a helical spring and where the helical spring is supported at one end against a fastening element of the piston rod and at the other end against a spring plate in the area of the outer cylinder. The spring plate is coaxial to the vibration damper and can be filled with hydraulic medium from an external source by way of a hydraulic piston-cylinder assembly, so that the helical spring can be subjected to the desired pretension. The spring plate is thus hydraulically adjustable, the pressure being generated externally.

Another self-pumping, height-adjustable spring strut unit for vehicles in which the spring plate of a helical spring is designed to be hydraulically adjustable is known from GB 2,164,417. The hydraulic adjustment is accomplished by the relative movement between the vehicle body and the vehicle axle, but this device requires electromagnetic control valves and an electrically operated distance sensor to regulate the level of the body. The previously mentioned designs are therefore dependent on outside energy to realize a fully automatic level control function and therefore have a correspondingly complex design. In particular, electronic sensing equipment and automatic controllers are liable to malfunction during the operation of the vehicle.

SUMMARY OF THE INVENTION

The task of the invention is to create a spring strut unit for suspension systems of motor vehicle which operates mechanically and/or hydraulically and is therefore unlikely to suffer from malfunctions, where the supply of outside energy and the need for outside control are eliminated.

This task is accomplished according to the invention in that a pump rod is mounted in a permanent axial position in the working cylinder of the vibration damper and cooperates with a cavity in the piston rod to form a pump space, where the axial movements of the piston rod causes damping medium to be conveyed through flow connections from one of the working spaces of the working cylinder via the pump space, through a flow connection of the pump rod, and into the ring-shaped cylinder.

The advantage here is that a vibration damper operating according to the two-tube principle with piston valves and bottom damping valves is used, in which the piston rod compensating space at the top serves simultaneously as a reservoir for the adjustment of the spring plate. The pump rod which travels into the hollow piston rod thus conveys the damping medium via appropriate check valves into the ring-shaped cylinder of the spring plate and moves this in the axial direction in correspondence with the additional load being added to the vehicle. When the extra load on the vehicle body is taken away, the damping medium flows back through a bore, which has now become exposed, into the compensating space. Because the spring strut unit operates according to the two-tube principle, preferably in the low-pressure range, the friction in the area of the piston rod guide is reduced to an optimum value.

In accordance with an essential feature, the helical spring and the ring-shaped cylinder coaxially surround the spring strut unit, but it is also possible for the spring strut unit to be arranged a certain distance away from the ring-shaped cylinder and the helical spring.

According to a favorable embodiment, at least one check valve is installed in the flow connection.

So that the vehicle body can be adjusted to an appropriate level, it is provided that the pump rod has at least one bore, which starts from the flow connection and proceeds to one of the working spaces.

According to an essential feature, the ring-shaped cylinder is provided with seals.

In an embodiment which is favorable from the standpoint of fabrication, the compensating space is axially adjacent to one of the working spaces.

In an elaboration of the invention, the flow connection proceeding from the pump rod extends through the bottom which separates the working space from the compensating space.

According to an essential feature, the bottom between the compensating space and the adjacent working space is provided with bottom damping valves.

According to another embodiment, a control sleeve is provided between the interior space of the piston rod and the pump rod.

The pump rod is also provided with a bypass.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 1 and 2 show cross sections of an automatic level-regulating spring strut unit in two different load states;

DETAILED DESCRIPTION OF THE PRESENTLY PREFERRED EMBODIMENTS

Figures 3, 4, 5:
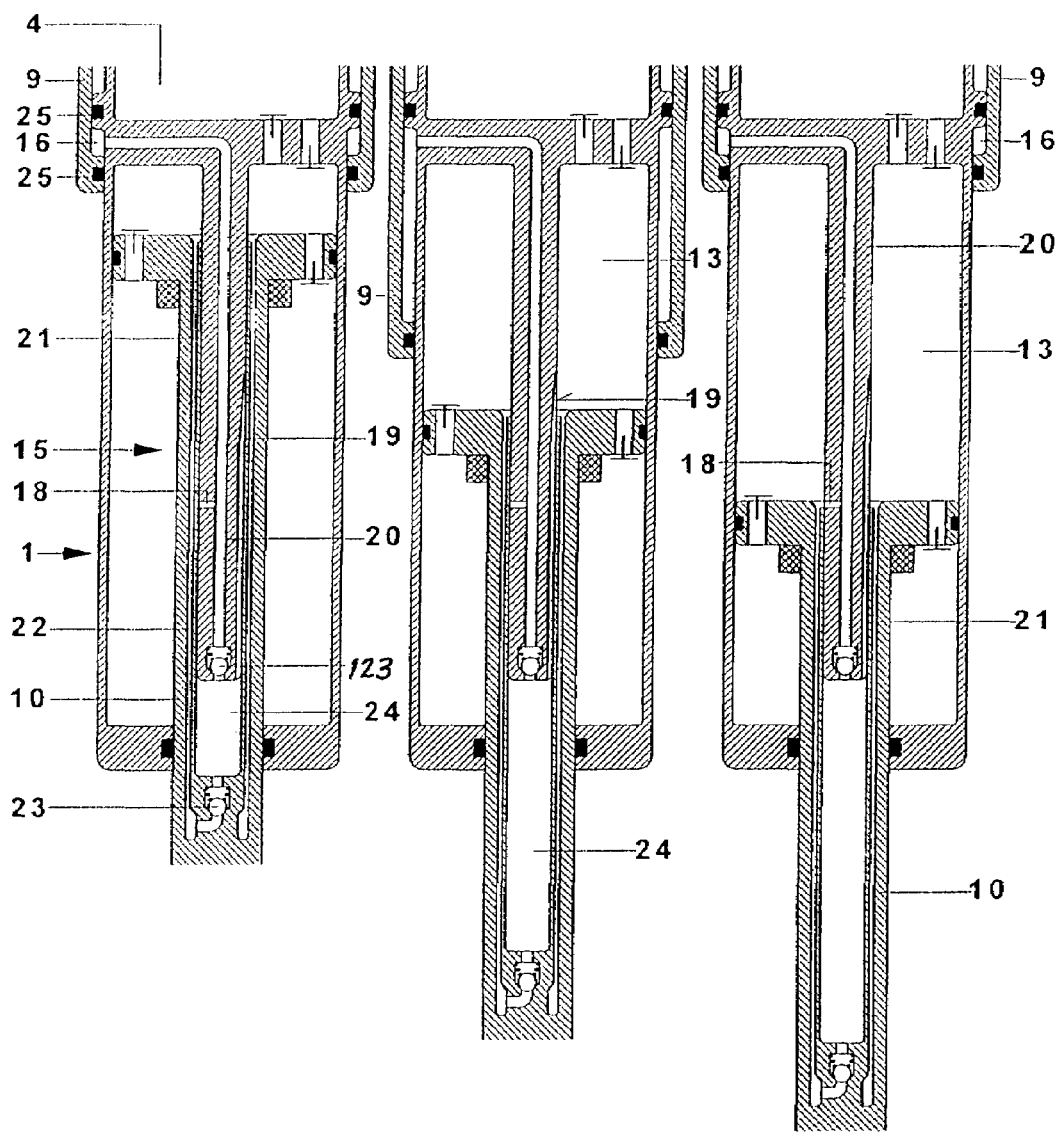
FIGS. 3-5 show cross sections of details of the unit at various levels.

The spring strut unit 1 shown in FIGS. 1 and 2 consists essentially of the damping piston 12, which is attached to the piston rod 10 and divides the working cylinder into the two working spaces 13, 14. The damping piston 12 is provided with damping valves 2, 102; the bottom 29 of the spring strut unit 1 has damping valves 3, 103 which lead to the compensating space 4. The compensating space 4 is filled with damping medium and a pressurized gas 5.

The helical spring 7 surrounds the vibration damper coaxially and is supported on a fastening part 11 of the piston rod 10 and on a spring plate 9.

In this exemplary embodiment, the spring strut unit 1 works according to the two-tube damping principle, because both the damping piston 12 and the bottom 29 are provided with damping valves 2, 102, and 3, 103. In addition, a compensating space 4 is provided. The compensating space 4 is filled with damping medium and a pressurized gas 5. The pressure of the gas 5 can be very low, because the pressure damping support proceeds by way of the damping valve 3 in the bottom 29. This offers the advantage that the seal 6 of the piston rod guide must absorb only a low internal system pressure and therefore can be designed to operate with minimal friction. The helical spring 7 surrounds the working cylinder 8 and is supported at the top end against a spring plate 9 and at the bottom end against a fastening part 11, which is connected to the piston rod 10.

As a result of the inward and outward travel of the piston rod 10, i.e., of the damping piston 12, a damping pressure is generated alternately in the upper working space 13 and in the lower working space 14, where the volume of the piston rod 10 displaced in the working cylinder 8 acts on the gas 5. It is advantageous for the gas 5 to be present at the uppermost area of the working cylinder 8, because any gas which may be released from the damping medium inside the spring strut unit 1 under the effects of pressure will always be able to collect at this point.

During an automatic level-control operation in a certain load state such as that illustrated in FIG. 2, damping medium is conveyed out of the working space 13 or 14 and ultimately out of the compensating space 4 by way of a pump-and-control device 15 into the ring-shaped cylinder 16 of the spring plate 9. As a result, the spring plate 9 leaves its support 17 and, in correspondence with the amount of load on the vehicle, will occupy a new position on the working cylinder 8. The helical spring 7 is thus under greater pretension in the heavy load state (FIG. 2) than it is in the light load state (FIG. 1), but the level of the vehicle body remains the same.

FIG. 3 shows a section of the spring strut unit 1 according to FIGS. 1 and 2 in the fully loaded but still unregulated state of the spring strut unit 1. The bore 18 and the bypass 19 of the pump rod 20 are still covered by the control sleeve 21 of the piston rod 10, which means that, when the piston rod 10 travels outward, damping medium is conveyed from the compensating space 4, via the check valve 3, through the ring-shaped gap 22 and the check valve 23, and into the pump space 24; and when the piston rod travels inward, it is conveyed from the pump space, through an additional check valve 123 and an axial flow passage 101 in the hollow pump rod 20 into the ring-shaped cylinder 16 of the spring plate 9. The ring-shaped cylinder 16 is sealed off from the atmosphere by seals 25.

According to FIG. 4, the piston 10 then moves axially downward until the bypass 19 has produced a connection between the upper working space 13 and the pump space 24. Thus the vehicle body is prevented from being pumped up any further.

When the vehicle is relieved of its load as is shown in FIG. 5, the piston rod 10 first travels outward in correspondence with the spring rate of the helical spring 7 (not shown here), and the control sleeve 21 releases the bore 18. The body of the vehicle is now able to settle to a lower level, because the damping medium can flow back out of the ring-shaped cylinder 16 of the spring plate 9, through the hollow pump rod 20 and the drain bore 18, and into the uppermost working space 13, from which it can proceed via the valve 103 in the bottom 29 to the compensating space 4.

Figure 6:
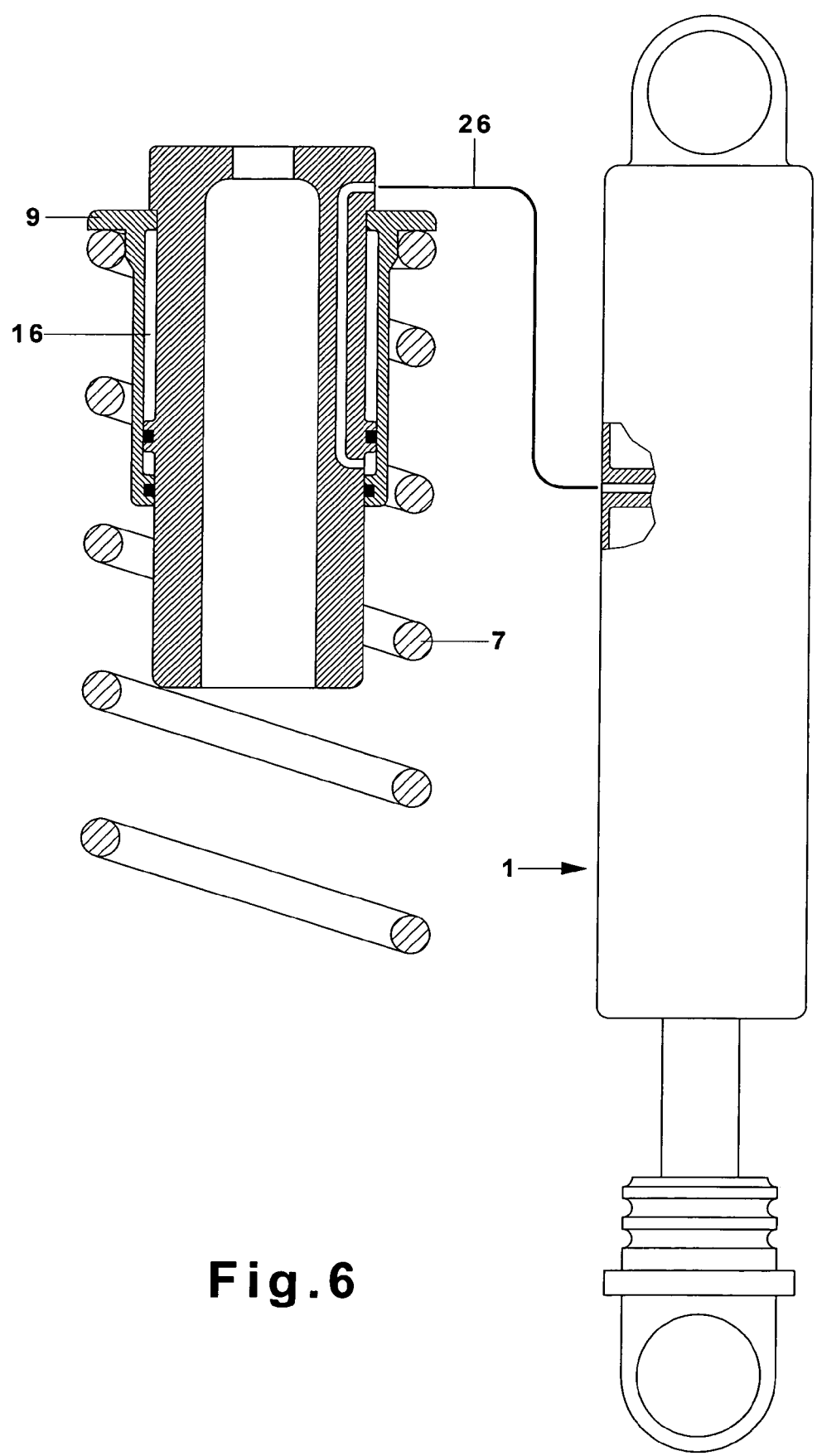
FIG. 6 show a spring strut unit with an externally mounted helical spring.

FIG. 6 shows a spring strut unit 1 in which the helical spring 7 is mounted externally and the pump cylinder 16 of the spring plate 9 is connected by a hose line 26 to the pressure-generating and level-regulating vibration damper.

Figure 7:
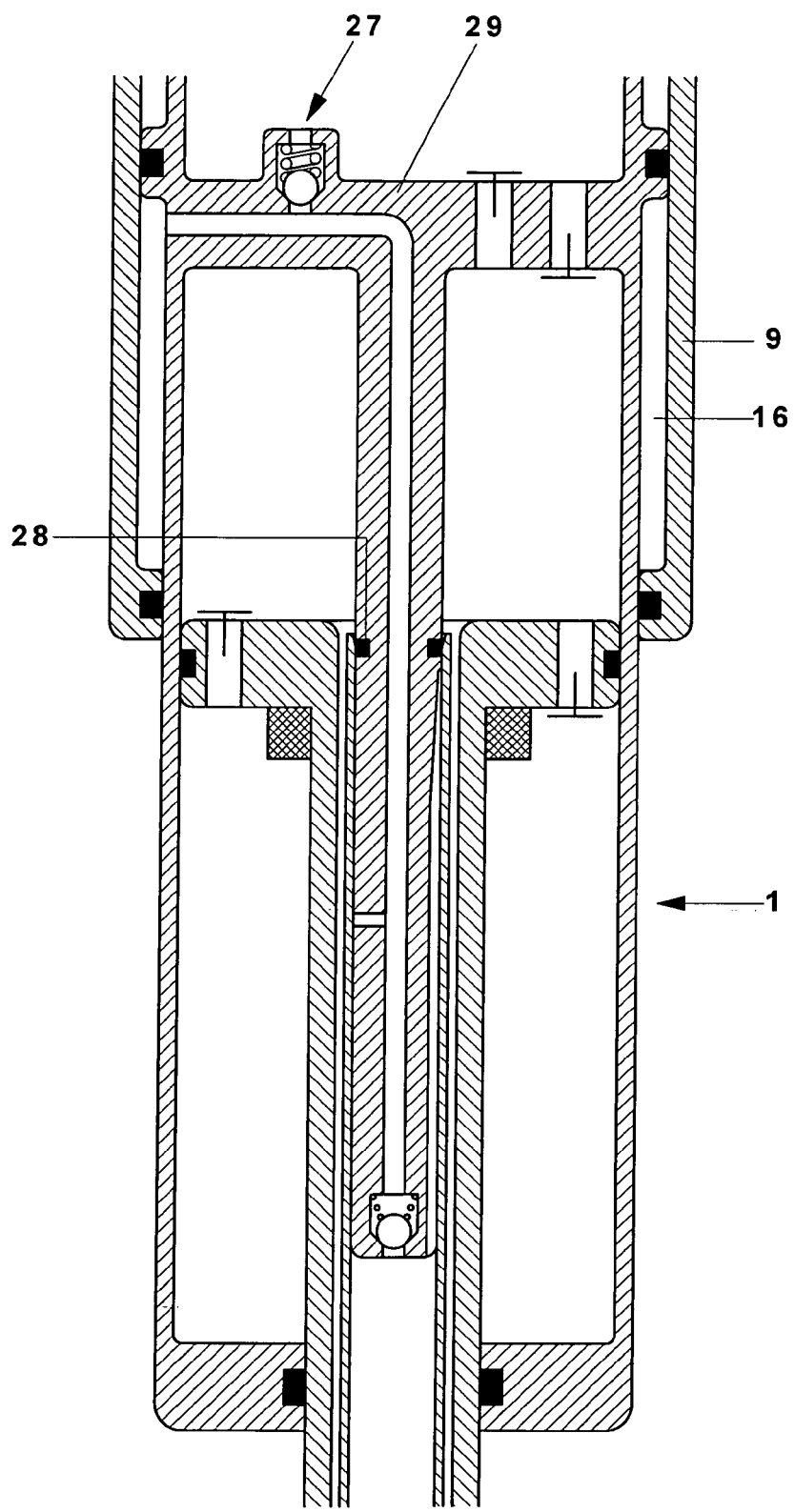
FIG. 7 shows, on an enlarged scale, an embodiment with an overload valve.

FIG. 7 shows, on an enlarged scale, the lower part of the spring strut unit 1 with an overload valve 27 installed at a suitable point. In this exemplary embodiment, the overload valve 27 is installed in the bottom 29 of the vibration damper. The overload valve 27 limits the pressure in the ring-shaped cylinder 16 of the spring plate 9 and thus protects the spring strut unit 1 from the damage which excessive pressure could cause as a result of an extreme load on the vehicle.

A pump rod seal 28 can be used, if it is necessary for the loaded vehicle to be maintained at an absolute height level over long periods of idleness. For design reasons, this height level will be slightly lower than the dynamic level of the spring strut unit 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A spring strut unit for a suspension system between a body and a wheel of a motor vehicle, the unit comprising an axially expandable ring-shaped cylinder, a helical spring which can be pretensioned by hydraulic medium in said ring-shaped cylinder, and a vibration damper, the vibration damper comprising:
   a working cylinder,
   a damping piston separating the cylinder into an upper working space and a lower working space, the damping piston having damping valves connecting the working spaces,
   a compensating space connected to one of the working spaces, wherein the compensating space is axially adjacent to said one of the working spaces and separated from said one of said working spaces by a bottom,
   a piston rod connected to the damping piston and extending from the cylinder, said piston rod having an axial cavity,
   a hollow pump rod fixed in said cylinder and received in said axial cavity of said piston rod to form a pump space, the hollow pump rod having an axial flow passage connected to the pump space and a drain bore which connects the flow passage to said one of the working spaces when the piston rod is extended from the cylinder by a predetermined amount;

a first flow connection connecting said one of the working spaces to the pump space, and a second flow connection connecting the axial flow passage to the ring-shaped cylinder, the second flow connection passing through said bottom, wherein axial movement of the piston rod causes damping medium to be conveyed from said one of the working spaces to the ring-shaped space via the flow connections and the pump space.

2. The spring strut unit of claim 1 wherein the ring-shaped cylinder and the helical spring surround the vibration damper.

3. The spring strut unit of claim 1 further comprising a check valve in said first flow connection.

4. The spring strut unit of claim 1 wherein the ring shaped cylinder comprises two concentric sleeves which are provided with seals.

5. The spring strut unit of claim 1 wherein the bottom is provided with damping valves between the compensating space and said one of said working spaces.

6. The spring strut unit of claim 1 further comprising a control sleeve received in said axial cavity of said piston rod, said pump rod being received in said control sleeve, said first flow connection being formed between said control sleeve and said piston rod.

7. The spring strut unit of claim 6 further comprising a bypass formed in said pump rod and connecting said pump space to said one of said working spaces when said piston rod is extended from said working cylinder by a predetermined amount.

8. The spring strut unit of claim 1 further comprising a check valve in said axial flow passage.

9. The spring strut unit of claim 1 wherein said one of the working spaces is the upper working space.

10. A spring strut unit for a suspension system between a body and a wheel of a motor vehicle, the unit comprising an axially expandable ring-shaped cylinder, a helical spring which can be pretensioned by hydraulic medium in said ring-shaped cylinder, and a vibration damper, the vibration damper comprising:

a working cylinder, a damping piston separating the cylinder into an upper working space and a lower working space, the damping piston having damping valves connecting the working spaces, a compensating space connected to one of the working spaces, a piston rod connected to the damping piston and extending from the cylinder, said piston rod having an axial cavity, a hollow pump rod fixed in said cylinder and received in said axial cavity of said piston rod to form a pump space, the hollow pump rod having an axial flow passage connected to the pump space and a drain bore which connects the flow passage to one of the working spaces when the piston rod is extended from the cylinder by a predetermined amount;

a check valve in said axial flow passage a first flow connection connecting said one of the working spaces to the pump space, and a second flow connection connecting the axial flow passage to the ring-shaped cylinder, wherein axial movement of the piston rod causes damping medium to be conveyed from said one of the working spaces to the ring-shaped space via the flow connections and the pump space.

11. The spring strut unit of claim 10 wherein the ring-shaped cylinder and the helical spring surround the vibration damper.

12. The spring strut unit of claim 10 further comprising a check valve in said first flow connection.

13. The spring strut unit of claim 10 wherein the ring shaped cylinder comprises two concentric sleeves which are provided with seals.

14. The spring strut unit of claim 10 wherein the compensating space is axially adjacent to said one of said working spaces.

15. The spring strut unit of claim 14 wherein the compensating space is separated from said one of said working spaces by a bottom, the second flow connection passing through said bottom.

16. The spring strut unit of claim 15 wherein the bottom is provided with damping valves between the compensating space and said one of said working spaces.

17. The spring strut unit of claim 10 further comprising a control sleeve received in said axial cavity of said piston rod, said pump rod being received in said control sleeve, said first flow connection being formed between said control sleeve and said piston rod.

18. The spring strut unit of claim 17 further comprising a bypass formed in said pump rod and connecting said pump space to said one of said working spaces when said piston rod is extended from said working cylinder by a predetermined amount.

19. The spring strut unit of claim 10 wherein said one of the working spaces is the upper working space.

* * * * *